United States Patent [19]
Young et al.

[11] 4,153,747
[45] May 8, 1979

[54] WRAP AROUND HEAT SHRINKABLE CLOSURE

[75] Inventors: Richard A. Young, Cupertino; Mark J. Stanek, Sunnyvale, both of Calif.

[73] Assignee: Sigmaform Corporation, Santa Clara, Calif.

[21] Appl. No.: 892,673

[22] Filed: Apr. 3, 1978

[51] Int. Cl.² ............................................. C09J 7/02
[52] U.S. Cl. .................................. 428/40; 428/349; 428/353; 428/354; 428/447; 138/99; 138/155
[58] Field of Search ............... 428/214, 353, 349, 447, 428/40, 41, 354, 343, 346; 156/329, 68, 212–218; 427/207 D, 207 B; 285/DIG. 10; 174/DIG. 8; 138/155, 99, 89

[56] References Cited
U.S. PATENT DOCUMENTS

| 2,939,488 | 6/1960 | Bacon | 156/329 |
|---|---|---|---|
| 3,146,799 | 9/1964 | Fekete | 156/329 |
| 3,770,556 | 11/1973 | Evans et al. | 428/77 |
| 3,959,052 | 5/1976 | Stanek | 156/86 |
| 3,983,298 | 9/1976 | Hahn et al. | 428/447 |
| 4,070,224 | 1/1978 | Zemlin et al. | 156/329 |
| 4,082,726 | 4/1978 | Mine et al. | 428/447 |
| 4,118,260 | 10/1978 | Boettcher | 156/215 X |

Primary Examiner—George F. Lesmes
Assistant Examiner—Alexander S. Thomas
Attorney, Agent, or Firm—Limbach, Limbach & Sutton

[57] ABSTRACT

Wrap around closures for cables, pipes, splices, and junctions to effect repair, insulation, waterproofing and the like and a method for preparing such closures are described. The closures comprise generally rectangular sheets of heat shrinkable polymer having a large central section which has been hot stretched and cooled while in stretched condition and two small, flat unstretched end sections integral with the central section. Each end section has a layer of non-silicone adhesive covering one of its surfaces, optionally a layer of non-porous support material covering and adhering to the adhesive layer, a layer of silicone adhesive covering and adhering to the non-silicone support layer and a peelably removable cover layer covering the upper surface of the silicone adhesive layer. The several layers lie on the upper surface of one of the end sections and on the lower surface of the other end section.

4 Claims, 3 Drawing Figures

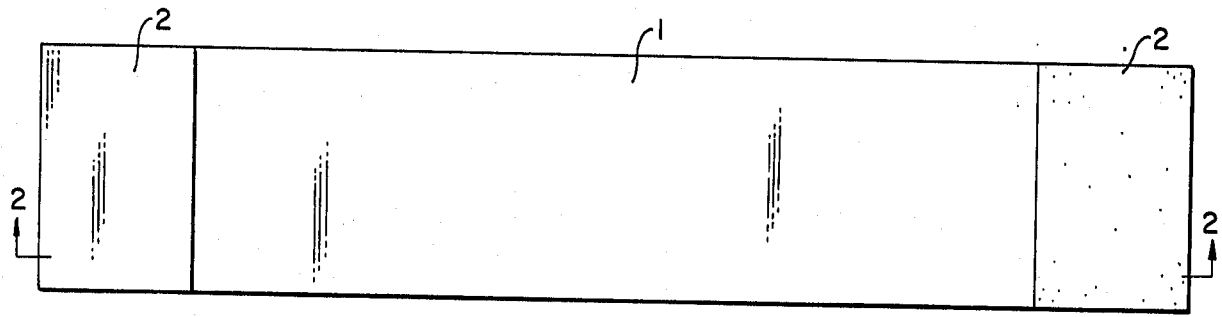
FIG._1.
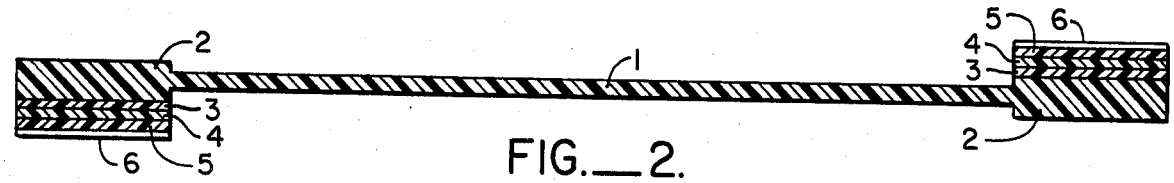
FIG._2.
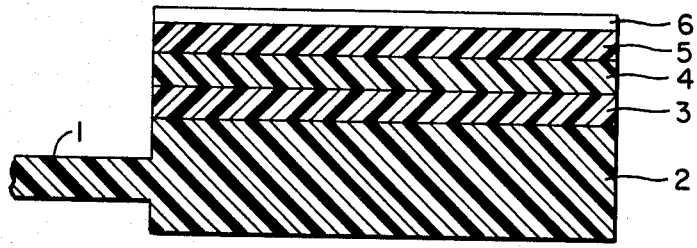
FIG._3.

WRAP AROUND HEAT SHRINKABLE CLOSURE

BACKGROUND OF THE INVENTION

Heat shrinkable tubing has been used for a number of years to replace tape and other tediuous means for protecting splices in cable and repair of pipe, etc. Commonly, the splice to be insulated or the pipe or cable to be covered is cut to permit the tube to be slipped over one segment followed by rejoining the cable or pipe, then slipping the heat shrinkable tube over the repair or splice. In many cases, however, it is not practical to slide a preformed tube over the splice or repair, it is useful to have a heat shrinkable member formed into a tube having an open longitudinal seam. Such a tube can be slipped around an existing splice or section of pipe or cable to be repaired eliminating the need to cut the cable in order to place the protective covering over it.

Heart shrinkable articles having such a tubular form have been disclosed in the literature as shown in U.S. Pat. No. 3,379,218. The method of closing the tube seam heretofore has consisted of some mechanical closure such as a metal rail, buttons, clamps, etc., to keep the fwo faces of the tube together during the heat shrinking process. A rigid mechanical closure has heretofore been found to be necessary because of the very high shear forces acting on the two ends which are held together during shrinking. While these mechanical closures have been successful in preventing the two edges from coming apart during heat recovery, they result in a bulky closure whose cross sectional area is much greater than wall thickness of the heat recoverable member. Therefore, during the heat shrinking or recovery process the wall of the tube becomes much hotter than the mechanical closure resulting in greater stress on the wall of the item during recovery which can lead to a split in the recovering portion. In order to simplify the closure system and avoid the disadvantages of mechanical closing means noted above, the employment of adhesives to bond the two ends of the closure sheet together has been described as in U.S. Pat. No. 3,770,556 and U.S. Pat. No. 3,959,052. So far as is known, closures of the type described in the first of the above two patents have not seen commercial use, presumably because adhesive bonds of the type described have not been sufficiently strong. The closure method described in the second of the above two noted patents has been in commercial use and provides a completely satisfactory closure. This method requires the use of lower alkyl-alpha-cyanoacrylate adhesives. These adhesives form bonds of enormous strength and result in finished closures which are entirely satisfactory. These adhesives, however, are chemically reactive and very quick setting. The adhesives must, however, be employed in the field, frequently under awkward working conditions and some users of such closures have been reluctant to make use of the cyanoacrylate adhesives because they must be handled with care if injury to personnel is to be avoided.

It is the object of the present invention to provide an adhesive means of sealing two edges of a heat shrinkable or recoverable article to form a tubular member around the item on which the member is being shrunk for purposes of repairing leaks, sealing splices or cable junctions which does not require field use of an adhesive which presents any hazard to personnel.

BRIEF DESCRIPTION OF THE INVENTION

The wrap around closures of the present invention comprise generally rectangular sheets of heat shrinkable polymer having a large central section which has been hot stretched and cooled to ambient temperature while in stretched condition and two small, flat unstretched end sections integrally attached to the central section. Each end section is covered with a layer of non-silicone adhesive, the adhesive layer is overlayed with a layer of silicone adhesive the upper surface of which is protected by a peelably removable cover layer. Optionally the non-silicone adhesive layer may be covered with a thin non-adhesive sheet of material such as metal foil, paper or plastic and in this embodiment this silicone adhesive layer is laid down on the upper surface of the non-adhesive sheet.

THE DRAWINGS

FIG. 1 of the appended drawings is a plan view of the closure sheet.

FIG. 2 of the drawings is a cross section of the closure sheet.

FIG. 3 of the appended drawings is an enlarged sectional view of one of the end sections of the closure sheet.

DETAILED DESCRIPTION OF THE INVENTION

The plastic sheet shown in FIG. 1 can be prepared by molding or extruding a flat sheet of a polyvinyl plastic material which is then cross-linked either by chemical means or by radiation. The molded or extruded sheet is then heated above the melting point of the crystalline portion of the cross-linked plastic material and while at elevated temperature, the two opposite end edges of the sheet are clamped and the material between the clamped edges is stretched and cooled below the crystalline melting point of the material while it is still in expanded condition. The resulting sheet has a central section which is heat shrinkable or heat recoverable and two end edges which, not having been stretched, do not shrink when heated. When it is desired to put the sheet into the tubular form, the sheet is shaped into tubular form after hot stretching and before the central section has been cooled to ambient temperature. In order to insure that the two flat end sections do not become involved in the stretching process, it may be desirable to cool the clamps which hold these end sections during the hot stretching process.

A sheet generally similar to that shown in FIG. 1 can also be prepared by extruding a plastic tube, hot stretching the tube until its circumference is about one and a half to four times the circumference of the original tube, slitting the tube from end to end so that it could be opened to form a rectangular sheet and then heating a narrow section of the plastic on each side of the slit to shrink these narrow section to pre-stretch dimensions. The result is a sheet in which the narrow sections which have been shrunk to pre-stretch dimension constitute the tabs or end sections 2 which are not heat shrinkable.

The plastic material from which the sheet shown in FIG. 1 can be formed can be any plastic material having the property of being stretchable to about 2 to 4 times its original dimension when heated above the melting points of its crystalline portion and then, if it is cooled while in stretched condition, having the property of returning toward its original dimension when heated to about 250°–375° F.

The preferred plastic materials are cross-linked vinyl polymers such as high density polyethylene, low density polyethylene, ethylene-vinyl acetate copolymers, ethylene-alkyl acrylate copolymers, chlorinated polyethylene, chlorosulfonated polyethylene, ethylene-propylene copolymers or mixtures of polyethylene with any of the modified polyethylenes. The cross-linking can be accomplished either by chemical treatment with peroxides such as dicumyl peroxide, 2,5 bis(t-butyl peroxy)-2,5 dimethyl hexane, $\alpha\alpha'$-bis(t-butyl peroxy) di-isopropyl benzene and the like or by subjecting the polymers to intense radiation.

FIG. 2 of the appended drawings is a cross-section of the complete closure device of the invention. Elements 1 and 2 in the drawing correspond to elements 1 and 2 of FIG. 1 being, respectively, a large central section which has been hot stretched and cooled while in stretched position and relatively small, unstretched sections which are integral with stretched section 1. Layers 3, 4, 5 and 6 which overlay the unstretched sections 2 are, respectively, a layer of a non-silicone adhesive, a non-porous non-adhesive layer, a silicone adhesive layer and an adherent cover layer. These several layers overlay the upper surface of the righthand unstretched section 2 and the lower surface of the lefthand unstretched section 2. The use of the non-porous non-adhesive layer is optional, it may be omitted and the silicone adhesive layer may be laid down on the surface of the non-silicone adhesive layer.

FIG. 3 of the drawings is an enlarged view of the multi-layer arrangement shown in respect to the righthand unstretched section 2 of FIG. 2. Non-silicone adhesive layer 3 is a thin layer of strongly adhesive material such as a lower alkyl cyanoacrylate adhesive such as the adhesive available commercially under the tradename LOCTITE 414, an epoxy adhesive or a neoprene adhesive. Layer 4 is optional but when used is a non-porous substrate material which may be glasscloth or a relatively inert strong plastic film such as a polyimide film. Suitable polyimide films are sold under the tradenames NOMEX and KAPTON. Layer 5 is a silicone adhesive such as diphenyl dimethyl siloxane. After application of the silicone adhesive to the substrate, it is preferably subjected to thermal treatment at about 300° F. for a short time to increase bond strength apparently by cross-linking. Cover layer 6 is a non-porous adherent which may be paper or a plastic film, the surface of which contracting the silicone adhesive is coated with an abherent material such as a wax or a metal salt of a higher fatty acid such as zinc, aluminum or calcium stearate. The abherent sheet is not strongly bonded to the silicone adhesive and may be readily peeled from its surface. Sheets of material consisting of layers 4, 5 and 6 assembled in the order shown in the drawing are commercially available. Also commercially available are strips of material consisting of materials of layers 4 and 5 shown in the drawings, for example, PERMACEL which is a glasscloth covered with a layer of silicone adhesive or SAUNDERS S-51 which is a polyimide (KAPTON) film coated with a silicone adhesive. These materials may be used in the preparation of the wrap around enclosure but when they are used, the abherent cover sheet 6 must be applied to their upper surfaces. These commercial products are commonly pretreated either thermally or chemically to strengthen the bond between the silicone resin and the substrate.

The surface of the closure sheet which is to be in contact with the material to be enclosed may be covered with a layer of hot melt sealant (not shown in the drawing) for the purpose of bringing the heat shrunk plastic sheet into close and continuous engagement with the article to be covered. Suitable sealants are well known in the art and include materials such as vinyl acetate polymer, wax, polyisobutenes, polyamides and the like.

EXAMPLE

A mixture of 50 parts low density polyethylene and 50 parts of chlorosulfonated polyethylene was compounded with carbon black, stabilizers and catalyst (1.5%), 2,5 bis(t-butyl peroxide) 2,5 dimethyl hexane. A slab molded from this material was cured at about 330° F. for five minutes and removed from the mold. The slab measured 4 by 5 inches and was 0.06 inch thick. The two opposite ends of the slab were clamped 0.75 inch in from the edge and the central section was heated to approximately 300° F. and stretched to a length of 10 inches and then cooled while in expanded condition. The righthand end section was then coated with a thin layer of lower alkyl cyanoacrylate adhesive (LOCTITE 414). A strip of material having dimensions corresponding to the surface of the end section and consisting of a polyimide film substrate, a layer of silicone adhesive (diphenyl dimethyl siloxane polymer) and a strip of paper having an abherent coating on its lower surface. This three-layer strip of material was pressed down on the cyanoacrylate adhesive so that the polyimide film was in contact with the cyanoacrylate. The lefthand unstretched section was covered in the same manner but the covering was applied to the face of the lefthand unstretched section opposite to that of the righthand unstretched section previously covered. The hot stretched central section was coated with a layer of ethyl vinyl acetate polymer to function as a hot melt sealant. The sealant was applied to only one surfce of the stretched central section. The sheet was then wrapped around a two inch cable with the hot sealant surface in contact with the cable. The abherent cover layers were peeled from the silicone adhesive on each end strip and the two layers of silicone adhesive were pressed together and adhesively joined. A gas fired propane torch was then applied uniformly to the entire surface of the wrap around closure which was now in tubular form bringing the temperature of the wrap around sheet to a level above about 300° F. and the heating was continued until the closure shrunk into firm contact with the cable.

The silicone-to-silicone adhesive bond regularly exhibits a shear strength above 10 lbs. per inch and forms a secure closure.

The closure of the present invention has several significant advantages over the closure described in U. S. Pat. No. 3,959,052. The cyanoacrylate adhesives do not bond strongly when applied at temperatures below about 30° F. while the silicone adhesives bond strongly at sub-zero temperatures. Cyanoacrylate adhesive has to be applied to the surfaces of the polymer sheet in the field and since this adhesive is a very quick setting adhesive, any lack of care by the workman applying it would result in skin-to-skin bonds so that workmen could find two or more fingers stuck together which is, as a minimum, a nuisance and can be hazardous. The silicone-to-silicone adhesive bond is not affected by the presence of water which is frequently a material present in field application, in fact, the silicone-to-silicone bond can be made under water.

Recourse to the multilayer arrangement above-described was made necessary because it was found that when the two unstretched end sections were simply coated with silicone adhesive, then the two silicone layers were brought together, the silicone-to-silicone bond was completely strong but the silicone adhesive did not adhere strongly to the cross-linked polyolefin sheet. Because of the weakness of this silicone to polymer sheet bond, it was found necessary to use the layer of non-silicone adhesive on the upper surface of which a layer of silicone adhesive is disposed. Optionally a non-adhesive, non-porous support sheet may be bonded to the non-silicone adhesive and the silicone adhesive layer is then disposed on the upper surface of the support sheet.

What is claimed is:

1. A wrap around heat shrinkable closure comprising a generally rectangular sheet of heat shrinkable polymer having a large central section which has been hot stretched and cooled while in stretched condition and two small flat unstretched end sections integral with the central section, each end section having a layer of non-silicone adhesive covering one of its surfaces, a layer of silicone adhesive covering and adhering to said non-silicone adhesive layer and a peelably removable cover layer covering the surface of the silicone adhesive layer, said several layers lying on the upper surface of one end section and on the lower surface of the other end section.

2. The closure defined in claim 1 wherein the non-silicone adhesive is a lower alkyl cyanoacrylate adhesive.

3. The closure defined in claim 1 wherein the non-silicone adhesive is a neoprene adhesive and the silicone adhesive is diphenyl dimethyl siloxane polymer.

4. The closure defined in claim 1 wherein a non-adhesive support sheet is disposed between the non-silicone adhesive layer and the silicone adhesive layer.

* * * * *